United States Patent
Menonna et al.

(10) Patent No.: US 9,512,872 B2
(45) Date of Patent: Dec. 6, 2016

(54) BEARING FRAME OR CYLINDER HEAD COVER OF AN INTERNAL COMBUSTION ENGINE

(71) Applicant: Mahle International GmbH, Stuttgart (DE)

(72) Inventors: Antonio Menonna, Ditzingen (DE); Stefan Steichele, Gerlingen (DE); Christoph Steinmetz, Ludwigsburg (DE)

(73) Assignee: Mahle International GmbH (DE)

( * ) Notice: Subject to any disclaimer, the term of this patent is extended or adjusted under 35 U.S.C. 154(b) by 169 days.

(21) Appl. No.: 14/222,289

(22) Filed: Mar. 21, 2014

(65) Prior Publication Data

US 2014/0299092 A1 Oct. 9, 2014

(30) Foreign Application Priority Data

Mar. 22, 2013 (DE) .......................... 10 2013 205 129

(51) Int. Cl.
*F01M 1/06* (2006.01)
*F01L 1/34* (2006.01)
(Continued)

(52) U.S. Cl.
CPC .............. *F16C 17/04* (2013.01); *B23P 11/025* (2013.01); *F01L 1/46* (2013.01); *F16C 21/00* (2013.01);
(Continued)

(58) Field of Classification Search
CPC ....... F01M 11/0004; F02F 7/006; F02B 77/13; F01L 1/3442; F01L 1/34; F01L 1/022
(Continued)

(56) References Cited

U.S. PATENT DOCUMENTS 2,500,823 A * 3/1950 Hickey ..................... F01B 7/12
123/48 B
4,593,657 A * 6/1986 Aoi ........................ F01L 1/0532
123/193.5
(Continued)

FOREIGN PATENT DOCUMENTS

DE 3206791 A1 11/1983
DE 3490389 T5 10/1985
(Continued)

OTHER PUBLICATIONS

Search Report for German Application No. DE 10 2013 205 129.8, dated Jan. 8, 2015, 10 pages.
(Continued)

*Primary Examiner* — Lindsay Low
*Assistant Examiner* — Syed O Hasan
(74) *Attorney, Agent, or Firm* — Fishman Stewart PLLC (57) ABSTRACT

A bearing frame or cylinder head cover of an internal combustion engine may include at least one camshaft mounted therein. The camshaft may be tunnel-mounted in at least two bearing openings arranged along a bearing channel. The bearing openings may enclose the camshaft. At least one axial bearing disc may be arranged on the camshaft. The bearing frame or cylinder head cover may have at least one recess which is open towards the camshaft. The at least one recess may be configured to circumferentially guide the axial bearing disc via two opposing axial bearing end faces of the axial bearing disc interacting with a side wall region of at least one side wall of the at least one recess, thereby forming an axial bearing for the camshaft.

20 Claims, 5 Drawing Sheets (51) Int. Cl.
    *F02F 7/00*     (2006.01)
    *F16C 17/04*     (2006.01)
    *B23P 11/02*     (2006.01)
    *F01L 1/46*     (2006.01)
    *F16C 21/00*     (2006.01)
    *F01L 1/047*     (2006.01)
    *F01M 9/10*     (2006.01)

(52) U.S. Cl.
    CPC .... *B23P 2700/02* (2013.01); *F01L 2001/0476* (2013.01); *F01M 9/10* (2013.01); *Y10T 29/49865* (2015.01)

(58) Field of Classification Search
    USPC ................................ 123/90.17, 90.34, 195 C
    See application file for complete search history.

(56) References Cited

U.S. PATENT DOCUMENTS

| | | | | |
|---|---|---|---|---|
| 4,957,079 | A * | 9/1990 | Nakatani | F01L 1/0532 123/196 M |
| 5,778,841 | A * | 7/1998 | Reedy | F01L 1/053 123/90.34 |
| 6,182,622 | B1 * | 2/2001 | Goloyatai-Schmidt | F01L 1/344 123/90.15 |
| 2001/0042527 | A1 * | 11/2001 | Uchida | F01L 1/02 123/90.15 |
| 2007/0283913 | A1 * | 12/2007 | Reinhart | F01L 1/047 123/90.34 |
| 2011/0083626 | A1 | 4/2011 | Flender et al. | |

FOREIGN PATENT DOCUMENTS

| | | |
|---|---|---|
| DE | 3431361 C2 | 6/1994 |
| DE | 10331089 A1 | 2/2005 |
| DE | 102006036851 A1 | 6/2007 |
| DE | 102007014544 A1 | 10/2008 |
| DE | 102007024092 A1 | 11/2008 |
| DE | 102009031455 A1 | 1/2011 |
| DE | 102009049218 A1 | 4/2011 |
| DE | 102011012149 A1 | 9/2012 |
| EP | 1471213 A2 | 10/2004 |
| JP | 11-0257124 A | 9/1999 |

OTHER PUBLICATIONS

English Abstract for DE 3431361.
English Abstract for DE 3206791.
English Abstract for DE 102006036851.
English Abstract for DE 102007024092.
English Abstract for DE 102011012149.
English Abstract for DE 3490389.
English abstract for DE-10331089.
English abstract for DE-102007014544.
English abstract for DE-102009031455.

* cited by examiner

BEARING FRAME OR CYLINDER HEAD COVER OF AN INTERNAL COMBUSTION ENGINE

CROSS-REFERENCE TO RELATED APPLICATIONS

This application claims priority to German Patent Application No. 10 2013 205 129.8, filed Mar. 22, 2013, the contents of which are hereby incorporated by reference in their entirety.

TECHNICAL FIELD

The present invention relates to a bearing frame or a cylinder head cover of an internal combustion engine having at least one camshaft, according to the preamble of the claim 1. The invention further relates to an internal combustion engine and a method for installing such a camshaft.

BACKGROUND

Camshafts are needed for actuating the inlet and outlet valves in internal combustion engines, wherein due to the complexity of modern camshafts, assembly and installation thereof becomes increasingly difficult.

From DE 103 31 089 A1, a generic cylinder head cover for an internal combustion engine having at least one camshaft is known, which camshaft protrudes through at least one bearing bridge along a bearing channel for the camshaft in the cylinder head cover, wherein said bearing bridge has an opening or bore that completely encloses the camshaft.

From DE 10 2007 014 544 A1, an internal combustion engine having at least one camshaft is known, which camshaft, for forming an axial bearing, has at least one stop element that interacts with a bearing frame of the axial bearing for axial mounting. The stop element is formed by a cam of the camshaft, and the bearing frame also provides a free space for the cam shape of the cam. Through this, axial mounting via a cam can be achieved.

From DE 10 2009 031 455 A1, a further internal combustion engine is known, which has a camshaft system with a first camshaft for controlling gas exchange valves of the internal combustion engine. A gearwheel is arranged rotationally fixed on said camshaft. In order to be able to implement axial mounting of the camshaft in a manner as simple as possible, a housing part of the internal combustion engine has an internal housing recess in which the gearwheel is circumferentially guided at least in certain sections in such a manner that the gearwheel, at least with end face regions of its two opposing gearwheel end faces, interacts in each case with a side wall region of in each case one side wall of the recess. The gearwheel thus has two functions, namely, on the one hand, as a drive element and, on the other, as an axial bearing for the camshaft.

From DE 10 2009 049 218 A1, a camshaft of an internal combustion engine having at least one one-piece pressure disc is known, which pressure disc is arranged between a drive element fixedly joined with the camshaft and a functional element that likewise is fixedly joined with the camshaft and, moreover, is captively fixed therebetween.

All above-described solutions for axially mounting a camshaft in an internal combustion engine have in common that the complete camshaft is placed into a split bearing arrangement such as, for example, a bearing block or a split cylinder head. This cannot be done in the case of a camshaft assembled in a cylinder head cover or a bearing frame, so that in this case, the axial bearing usually is implemented by a ball bearing (cf. DE 103 31 089 A1). However, such a ball bearing requires significant radial installation space in the cylinder head cover or the bearing frame, which is contrary to the advantage of a cylinder head cover, namely to provide a light and compact design. Also, conventional axial mounting by means of slide bearings, for example, by attaching two flanged cams at two sliding surfaces in the housing often proves to be problematic since there is only little space available in the cylinder head for such cams. However, holding the cam during assembly proves to be a particular problem because normally only one of the two cams can be held in a properly supported manner on a plane surface in the insertion direction of the shaft.

SUMMARY

The present invention thus is concerned with the problem of providing an improved embodiment for a bearing frame or a cylinder head cover of the generic kind, which is in particular characterized by improved axial mounting of the camshaft.

This problem is solved according to the invention by the subject matters of the independent claims. Advantageous embodiments are subject matter of the dependent claims.

The present invention is based on the general idea of mounting a camshaft in a tunnel bearing of a bearing frame or a cylinder head cover and to implement at the same time axial mounting of the camshaft only at this cylinder head cover or bearing frame. For this, according to the invention, the above-described bearing frame or the cylinder head cover has at least two bearing openings in which the camshaft is tunnel-mounted. These bearing openings enclose the camshaft completely. In addition, at least one axial bearing disc is arranged on the camshaft, via which axial bearing disc axial mounting of the camshaft is carried out. The bearing frame or the cylinder head cover has at least one recess which is open towards the camshaft and in which the axial bearing disc is circumferentially guided at least in certain sections in such a manner that the axial bearing disc, at least with end face regions of its two opposing axial bearing disc end faces, interacts in each case with a side wall region of in each case one side wall of the recess and thereby forms the desired axial bearing for the camshaft. Through this, an assembled camshaft can be mounted at the same time in the axial direction in a tunnel bearing of a cylinder head cover or a bearing frame without the need of costly ball bearings which, in addition, require significant radial installation space. Moreover, axial mounting with the axial bearing disc does not require any changes when fitting the assembled camshaft in the cylinder head or the bearing frame since the axial bearing disc is simply slid onto the camshaft like a further functional element such as, for example a cam. Moreover, a particular advantage of the axial mounting according to the invention is that said mounting also requires comparatively little installation space in the axial direction of the camshaft, which proves to be a great advantage in particular compared to the flanged cams with sliding faces that were used up to now for this purpose. By using an axial bearing disc which partially is in engagement with the bearing frame or the cylinder head cover, it is possible to achieve a simple and, at the same time, space-saving axial mounting, which, in combination with the previously mentioned radial needle bearings or slide bearings, enables low-friction mounting of the camshaft in the cylinder head cover or in the bearing frame. Moreover, the camshaft according to the invention can be installed in a comparatively simple manner.

Advantageously, the camshaft is mounted in the radial direction via at least one additional anti-friction bearing, in particular via a needle bearing or via a slide bearing. This itemization already indicates that the inventive axial bearing with the axial bearing disc can be combined with all known radial bearings, in particular with such bearings that allow tunnel-mounting of the camshaft, that is, without split bearing blocks.

Advantageously, the axial bearing disc has an oil hole via which oil can be supplied through the bearing frame, the camshaft or the cylinder head cover. Such an oil hole usually runs in the radial direction of the axial bearing disc and thus enables lubricant supply or oil supply to the axial bearing, for example, via the bearing frame or the cylinder head cover. Of course, it is also conceivable that oil supply for lubricating the axial bearing disc takes place via the camshaft, wherein in this case, an oil hole in the camshaft has a greater diameter than the oil hole in the axial bearing. Through this, in particular potential joining errors when joining, in particular, thermally joining the axial bearing disc onto a shaft tube of the camshaft can be compensated. With oil holes arranged aligned with each other in such a manner in both the camshaft and the axial bearing disc, it is also possible as an alternative to the solution described in the preceding paragraph to lubricate the axial bearing via the camshaft.

In another advantageous embodiment of the solution according to the invention, the axial bearing disc can be designed as a sensor wheel. Such a configuration of the axial bearing disc as a sensor wheel has the great advantage that the axial bearing disc can fulfill an additional function, namely, in this case, detecting a rotation angle of the camshaft. Of course, designing the axial bearing disc as a different functional element is also possible.

In another advantageous embodiment of the solution according to the invention, a cap is fitted over the axial bearing disc, which cap encloses the axial bearing disc at least partially and thus reduces oil losses. This cap is screwed to the bearing frame or the cylinder head. In order to allow exact alignment of the cap with the bearing frame or the cylinder head, dowel holes with dowel pins can be provided. Said cap can absorb additional axial forces or simply serves as shield against splattering oil.

The invention is furthermore based on the general idea of providing, due to the configuration of the axial bearing by means of the axial bearing disc according to the invention, a simplified installation method for installing a camshaft in a bearing frame or a cylinder head cover. In the method according to the invention, first of all, the axial bearing disc and at least one further functional element, for example a cam or a sensor wheel, are arranged in alignment with each other and in a defined angular position in a fitting device, in particular in holding devices of the fitting device. Subsequently, the axial bearing disc and the at least one functional element are heated to a joining temperature, or the shaft of the camshaft, that is, a shaft tube of the camshaft, is cooled. Of course, heating the axial bearing disc or the functional element, or cooling the shaft tube of the camshaft can also be carried out at the beginning.

In a following method step, the shaft of the camshaft is pushed along a bearing channel through bearing openings arranged there in the bearing frame or the cylinder head cover, and in the process of this, the axial bearing disc and the at least one functional element are slid on at the same time. After temperature equalization, the camshaft is fixed in the bearing space or in the cylinder head cover and can be removed together with the latter from the fitting device. This enables a comparatively simple installation of the camshaft according to the invention in a closed tunnel bearing of a cylinder head cover or a bearing frame.

Further important features and advantages of the invention arise from the sub-claims, from the drawings, and from the associated description of the figures based on the drawings.

It is to be understood that the above-mentioned features and the features still to be explained hereinafter are usable not only in the respective mentioned combination, but also in other combinations or alone, without departing from the context of the present invention.

Preferred exemplary embodiments of the invention are illustrated in the drawings and are explained in more detail in the following description, wherein identical reference numbers refer to identical or similar or functionally identical components.

DETAILED DESCRIPTION

Figures 1A, 1B:
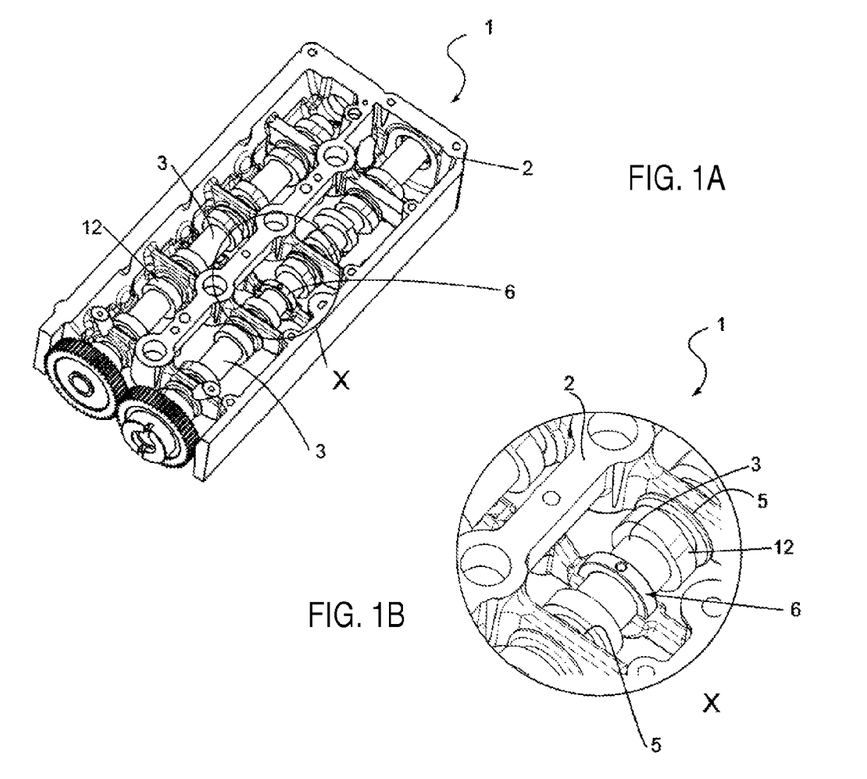
FIG. 1A shows a view of an internal combustion engine in the region of two camshafts, comprising a bearing frame in which the camshaft is mounted.
FIG. 1B shows a detailed view X of the internal combustion engine in the region of two camshafts according to FIG. 1A.
Figure 2:
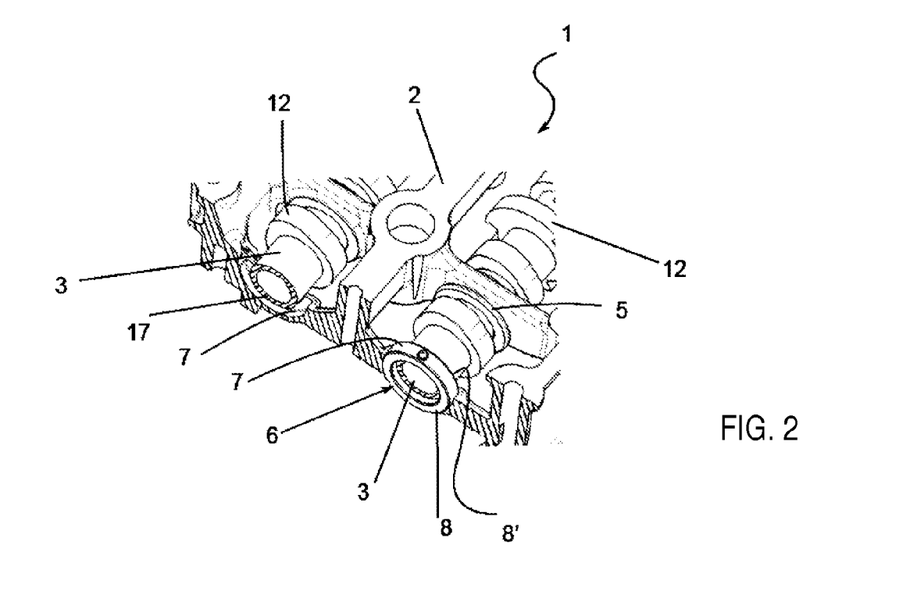
FIG. 2 shows a detailed sectional view from FIG. 1A.

According to the FIGS. 1 and 2, an internal combustion engine 1 according to the invention has a bearing frame 2 in which at least one camshaft 3 is mounted. According to FIG. 1, two camshafts 3 are mounted in the bearing frame 2 of the internal combustion engine 1. In the following description of the figures and in entire application, the term "bearing frame 2" can generally also stand for a cylinder head cover 4 so that the camshafts 3 can also be mounted in the same manner in the cylinder head cover 4. According to the invention, the camshaft 3 is tunnel-mounted in the bearing frame 2 or in the cylinder head cover 4 in at least two bearing openings 5 arranged along a bearing channel, wherein the bearing openings 5 enclose the camshaft 3 completely. For axially mounting the camshaft 3, at least one axial bearing disc 6 is arranged on the camshaft 3. Moreover, the bearing frame 3 or the cylinder head cover 4 has a recess 7 (cf. FIG. 2) which is open towards the camshaft 3 and in which the axial bearing disc 6 is circumferentially guided at least in certain sections in such a manner that the axial bearing disc 6, at least with end face regions of its two opposing axial bearing disc end faces 8, 8' (cf. FIG. 2), interacts in each case with a side wall region of in each case one side wall of the recess 7 and forms an axial bearing for the camshaft 3. Accordingly, the axial bearing disc 6 does not have to be enclosed over the entire circumference by the recess 7 in the bearing frame 2 or in the cylinder head cover 4; rather, a circumferentially limited region is sufficient, as is also illustrated according to the FIGS. 3 (upper illustration) and 4.

Figure 3A:
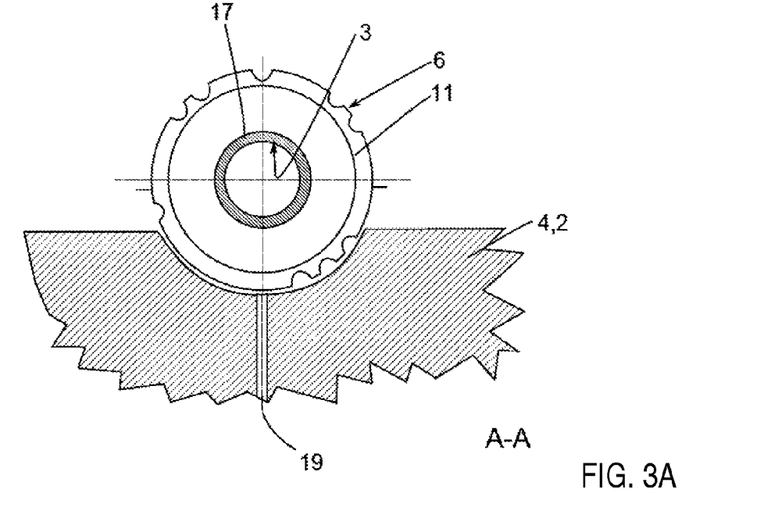
FIG. 3A shows a cross-sectional view A-A of a bearing frame or a cylinder head cover with an axial bearing disc configured as a sensor wheel, the line of plane A-A being identified in FIG. 3B.
Figure 3B:
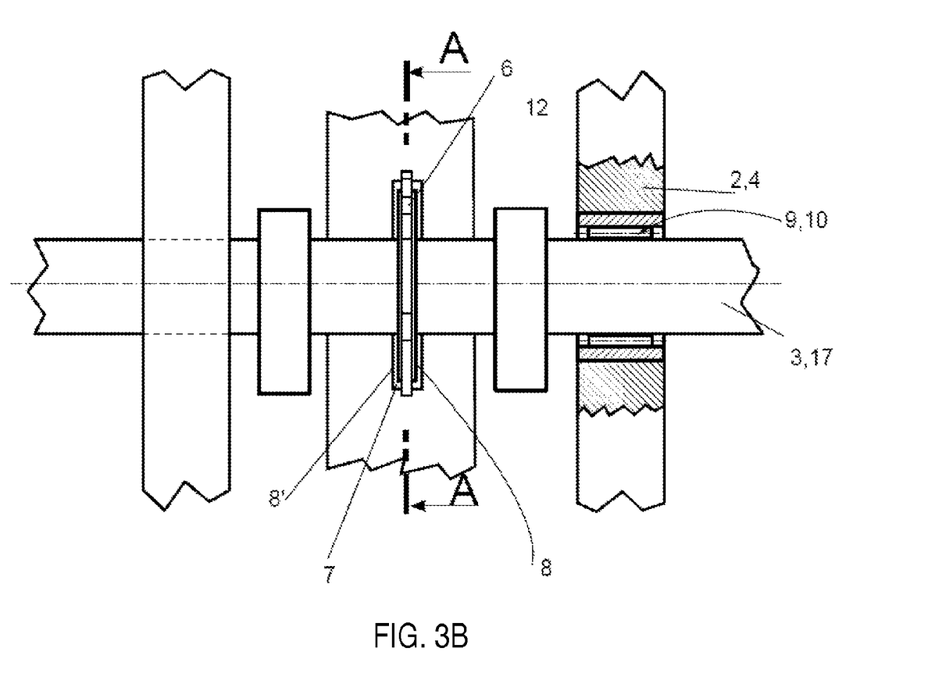
FIG. 3B shows a longitudinal sectional view of the bearing frame or cylinder head cover of FIG. 3A.

When viewing, for example, FIG. 3, it is apparent that the camshaft 3 is mounted in the radial direction via at least one additional anti-friction bearing 9, for example a needle bearing 10. According to the sectional view A-A, it can also be seen that the axial bearing disc 6 in the embodiment illustrated according to FIG. 3 is configured as a sensor wheel 11, as a result of which a rotation angle of the camshaft 3 can be detected via said sensor wheel 11. Also, in the sectional view A-A in FIG. 3 it can be seen that the sensor wheel 11, that is, respectively, the axial bearing disc 6 engages only partially, that is, along a partial circumference, in the recess 7 of the bearing frame 2 or the cylinder head cover 4, which, however, is sufficient for axially mounting. Of course, further functional elements, for instance cams 12, can be arranged on the camshaft 3 in addition to the axial bearing disc 6 (cf. FIGS. 1 to 8).

Figure 4A:
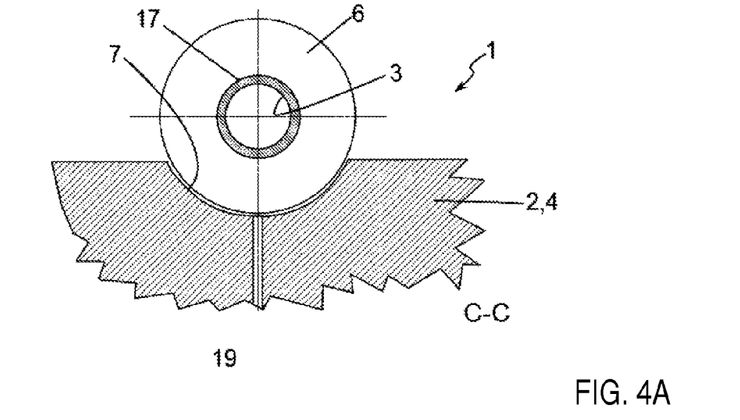
FIG. 4A shows a cross-sectional view C-C of a camshaft mounted onto a bearing frame according to the invention, the line of plane C-C being identified in FIG. 4B.
Figure 4B:
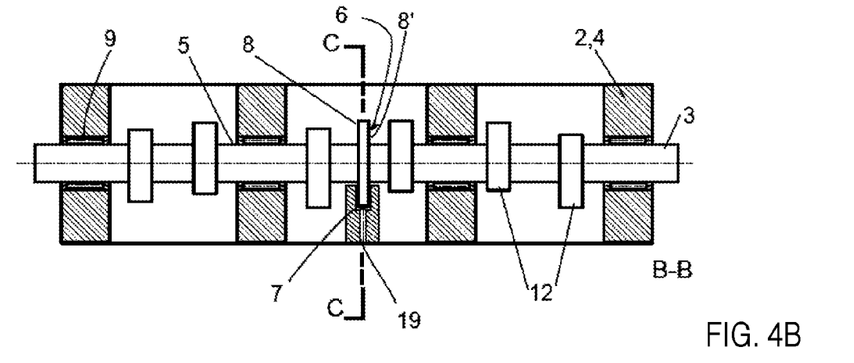
FIG. 4B shows a sectional view B-B through the axial bearing in the region of the axial bearing disc, the line of plane B-B being identified in FIG. 4C.
Figure 4C:
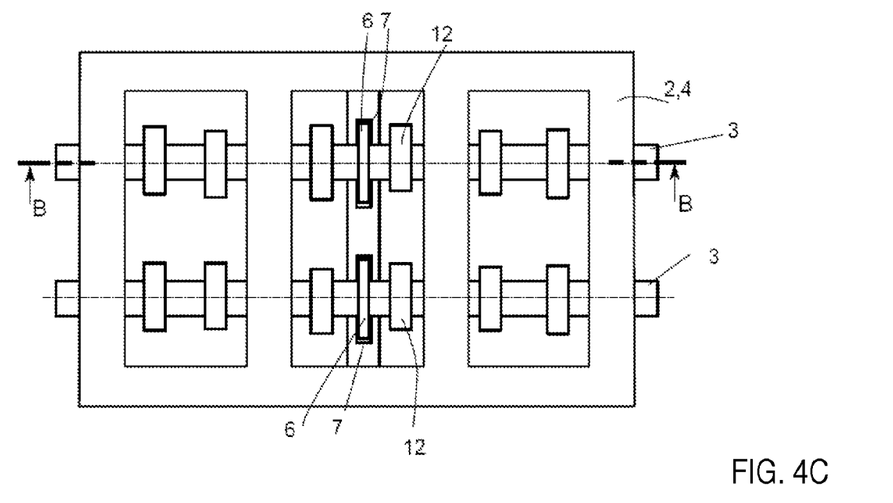
FIG. 4C shows a sectional view through the axial bearing in the region of the axial bearing disc of two camshafts tunnel-mounted in a bearing frame or cylinder head cover according to one implementation.
Figure 5:
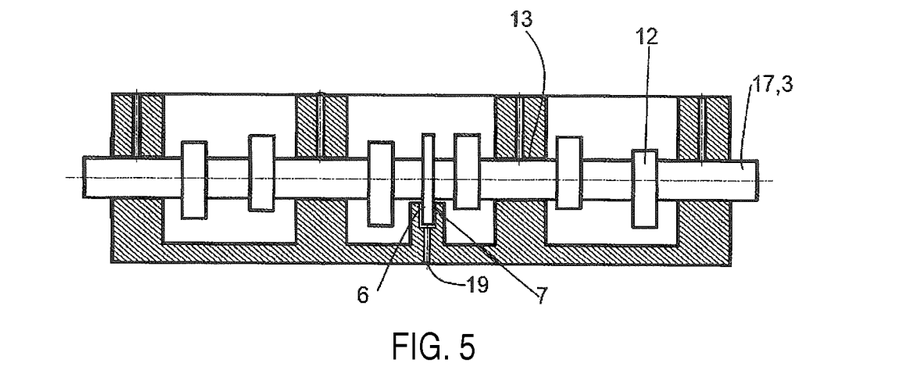
FIG. 5 shows a tunnel-mounted camshaft with radial slide bearings.
Figure 6A:
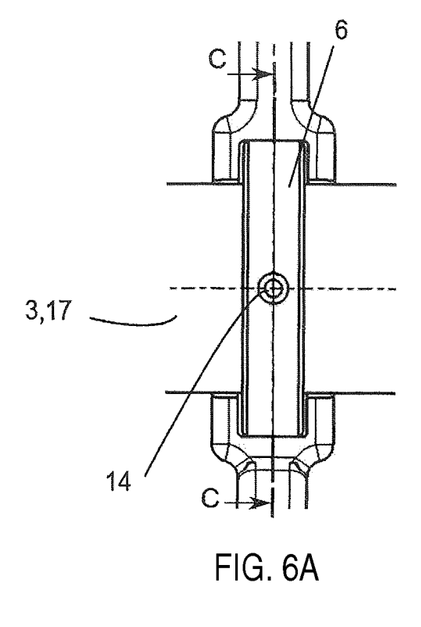
FIG. 6A shows a sectional view through the axial bearing in the region of the axial bearing disc, FIG. 6 B shows a sectional view C-C of the axial bearing of FIG. 6A, the line of plane C-C being identified in FIG. 6A.
Figure 6B:
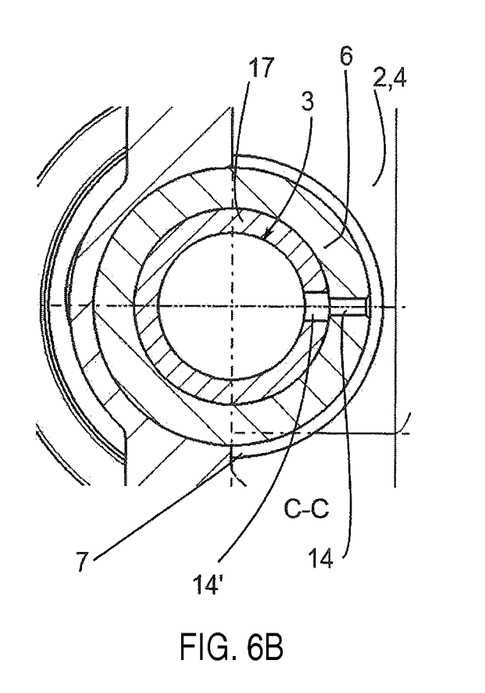

In the illustration according to FIG. 4, a bearing frame 2 or a cylinder head cover 4 is shown again in which the two camshafts 3 are tunnel-mounted. Each of the two camshafts 3 is mounted in the axial direction via a separate axial bearing disc 6 in an associated recess 7 of the bearing frame 2 or the cylinder head cover 4. In the case of the bearing frame 2 or the cylinder head cover 4, the camshaft 3 is mounted again in the radial direction via anti-friction bearings 9, in particular, via needle bearings 10. An embodiment that differs therefrom is illustrated, for example, according to FIG. 5, in which the camshaft 3 is mounted in the radial direction via at least one slide bearing 13.

In order to be able to ensure an axial mounting in which the camshaft 3 runs as smooth as possible, the axial bearing disc 6 can comprise an oil hole 14 (cf. 3, 4, 5, 6 and 8) via which oil can be supplied through the bearing frame 2 or the cylinder head cover 4. Alternatively, it is of course also possible to supply oil for lubricating the axial bearing disc 6 via the camshaft 3, for which reason an oil hole 14' is arranged in the camshaft 3. This oil hole 14' in the camshaft 3 usually has a greater diameter than the oil hole 14 in the axial bearing disc 6, as a result of which joining inaccuracies when joining the axial bearing disc 6 onto the camshaft 3 can be compensated. This is in particular illustrated in the sectional view C-C in FIG. 6.

If oil supply is carried out, for example, via the bearing frame 2 or the cylinder head cover 4, an oil supply channel 19 is provided therein, as illustrated according to the FIGS. 3 to 8.

Figure 7:
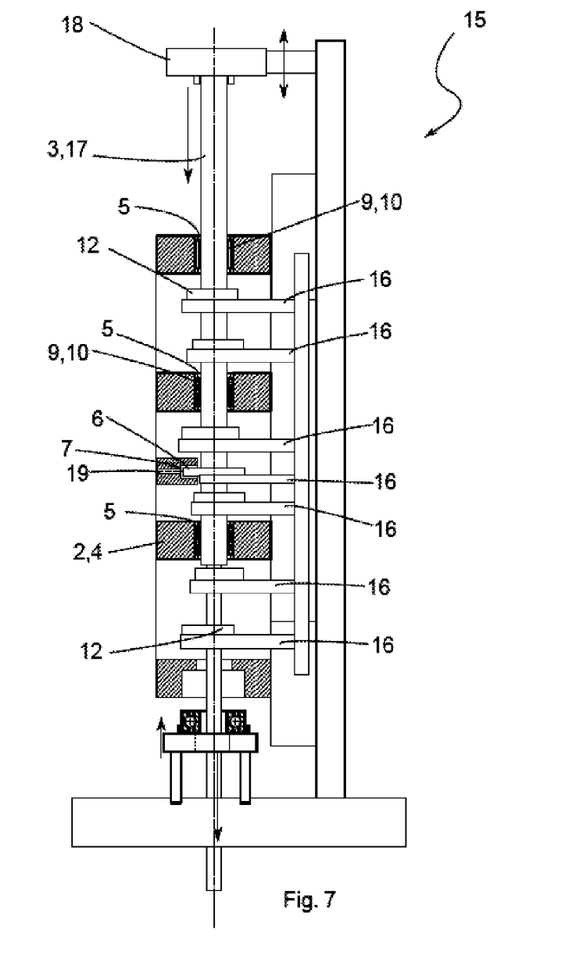
FIG. 7 shows a fitting device for installing the camshaft according to the invention in a bearing frame or in a cylinder head cover.

When viewing the FIG. 7, a fitting device 15 for installing the camshaft 3 in a bearing frame 2 or a cylinder head cover 4 can be seen. In the installation method according to the invention, first, the at least one axial bearing disc 6 and at least one further functional component, for example a cam 12 or a sensor wheel 11, are arranged aligned with each other and in a predefined angular position relative to each other in the fitting device 15, for example on suitable holders 16. For thermally joining a shaft tube 17 of the camshaft 3 with the axial bearing disc 6 or the cam 12 or the sensor wheel 11, the axial bearing disc 6 or the at least one further functional component is heated to a joining temperature, wherein, additionally or alternatively, the shaft 17 of the camshaft 3 can be cooled. Subsequently, the shaft 17 is pushed by means of a movable guide carriage 18 through the axial bearing disc 6 and the at least one further functional component, for example the cam 12, and, at the same time, is pushed through all bearing openings 5 of the bearing frame 2 or the cylinder head cover 4. Subsequently, a waiting period takes place during which a temperature equalization fixes both the axial bearing disc 6 and the cams 12 onto the camshaft 3, whereupon subsequently the camshaft 3 together with the bearing frame 2 or the cylinder head cover 4 can be removed from the fitting device 15.

Figure 8:
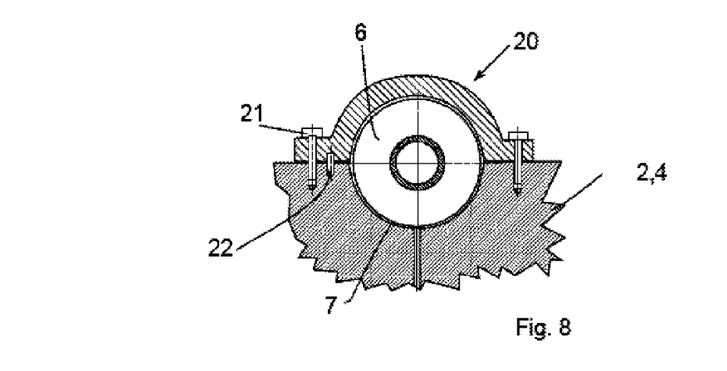
FIG. 8 shows a sectional view through the axial bearing in the region of the axial bearing disc, with a cap covering the axial bearing disc.

In the illustration according to the FIG. 8, an axial bearing disc 6 is shown that is mounted in the axial direction in an associated recess 7 of the bearing frame 2 or the cylinder head cover 4. In order to minimize oil losses, a cap 20 is placed over the axial bearing disc 6 in this embodiment according to the invention. The cap 20 is connected to the bearing frame 2 or the cylinder head cover 4 by means of screws 21. In order to enable exact alignment of the cap 20, the use of dowel pins 22 is provided.

With the axial bearing disc 6 according to the invention, which in a particularly preferred embodiment additionally also fulfills a further function, namely the function of a sensor wheel 11, tunnel mounting of an assembled camshaft 3 in a bearing frame 2 or a cylinder head cover 4 can be produced in a comparatively simple manner.

The invention claimed is:

1. A bearing frame or cylinder head cover of an internal combustion engine, comprising: at least one camshaft mounted therein,
    the at least one camshaft being tunnel-mounted in at least two bearing openings arranged along a bearing channel, wherein the at least two bearing openings enclose the at least one camshaft,
    at least one axial bearing disc arranged on the at least one camshaft,
    wherein the bearing frame or the cylinder head cover has at least one recess which is open towards the at least one camshaft, the at least one recess configured to circumferentially guide the at least one axial bearing disc via two opposing axial bearing end faces of the at least one axial bearing disc interacting with a side wall region of at least one side wall of the at least one recess, thereby forming an axial bearing for the at least one camshaft, and
    wherein the camshaft includes an oil hole via which oil supply for lubricating the at least one axial bearing disc is delivered, wherein the oil hole in the camshaft has a greater diameter than an oil hole in the at least one axial bearing disc.

2. The bearing frame or cylinder head cover according to claim 1, wherein the at least one camshaft is mounted in a radial direction via at least one anti-friction bearing.

3. The bearing frame or cylinder head cover according to claim 1, wherein the at least one camshaft is mounted in a radial direction via at least one slide bearing.

4. The bearing frame or cylinder head cover according to claim 1, wherein the oil hole of the at least one axial bearing disc can be supplied with oil through at least one of the bearing frame, the camshaft and the cylinder head cover.

5. The bearing frame or cylinder head cover according to claim 1, wherein the at least one axial bearing disc is configured as a sensor wheel.

6. The bearing frame or cylinder head cover according to claim 1, further comprising a cap fitted over the at least one axial bearing disc and secured to the bearing frame or the cylinder head cover.

7. The bearing frame or cylinder head cover according to claim 2, wherein the at least one anti-friction bearing includes a needle bearing.

8. The bearing frame or cylinder head cover according to claim 4, further comprising a cap fitted over the at least one axial bearing disc and secured to the bearing frame or the cylinder head cover.

9. An internal combustion engine, comprising: at least one of a bearing frame and a cylinder head cover;
at least one camshaft tunnel-mounted in at least two bearing openings arranged along a bearing channel, the at least two bearing openings enclosing the at least one camshaft; and
at least one axial bearing disc arranged on the at least one camshaft;
wherein at least one of the bearing frame and cylinder head cover includes at least one recess which is open towards the at least one camshaft, the at least one recess configured to circumferentially guide the at least one axial bearing disc via two opposing axial bearing end faces of the at least one axial bearing disc interacting with a side wall region of at least one side wall of the at least one recess, thereby forming an axial bearing for the at least one camshaft; and
wherein the at least one camshaft includes an oil hole via which oil supply for lubricating the at least one axial bearing disc is delivered, and wherein the oil hole in the at least one camshaft has a greater diameter than an oil hole in the at least one bearing disc.

10. The internal combustion engine according to claim 9, wherein the at least one camshaft is mounted in a radial direction via at least one anti-friction bearing.

11. The internal combustion engine according to claim 9, wherein the oil hole of the at least one axial bearing disc can be supplied with oil through at least one of the bearing frame, the at least one camshaft and the cylinder head cover.

12. The internal combustion engine according to claim 9, further comprising a cap fitted over the at least one axial bearing disc and secured to at least one of the bearing frame and the cylinder head cover.

13. The internal combustion engine according to claim 9, wherein the at least one axial bearing disc is configured as a sensor wheel.

14. The internal combustion engine according to claim 10, wherein the at least one anti-friction bearing includes a needle bearing.

15. The internal combustion engine according to claim 10, wherein the at least one anti-friction bearing is a slide bearing.

16. A mounting frame of an internal combustion engine, comprising:
at least two bearing openings arranged along a bearing channel;
a camshaft tunnel-mounted in the at least two bearing openings, wherein the at least two bearing openings enclose the camshaft;
an axial bearing disc arranged on the camshaft;
wherein the mounting frame has at least one recess open towards the camshaft, the at least one recess configured to circumferentially guide the axial bearing disc to define an axial bearing for the camshaft via two opposing axial bearing end faces of the axial bearing disc interacting with a side wall region of at least one side wall of the at least one recess; and
wherein the axial bearing disc includes an oil hole for supplying oil, and wherein the oil hole in the axial bearing disc has a smaller diameter than an oil hole extending radially through the camshaft.

17. The mounting frame according to claim 16, wherein the mounting frame is a bearing frame or a cylinder head cover.

18. The mounting frame according to claim 16, wherein the oil hole in the camshaft is aligned with the oil hole in the bearing disc.

19. The mounting frame according to claim 16, wherein the camshaft is mounted in a radial direction via at least one anti-friction bearing.

20. The mounting frame according to claim 16, wherein the axial bearing disc is configured as a sensor wheel.

* * * * *